United States Patent

[11] 3,615,185

[72] Inventors Joel B. Jacobs
 Lakewood;
 Steve Taborosi, Woodbridge, both of N.J.
[21] Appl. No. 778,303
[22] Filed Nov. 22, 1968
[45] Patented Oct. 26, 1971
[73] Assignee FMC Corporation
 New York, N.Y.

[54] PROCESS FOR THE PRODUCTION OF TRISODIUM PHOSPHATE
 4 Claims, No Drawings

[52] U.S. Cl. ...................................... 23/107,
 23/50 R
[51] Int. Cl. ...................................... C01b 25/28
[50] Field of Search ........................... 23/50, 107;
 252/385

[56] References Cited
 UNITED STATES PATENTS

| | | | |
|---|---|---|---|
| 1,700,973 | 2/1929 | Booth et al. ............... | 23/107 |
| 1,865,948 | 7/1932 | Nutt ........................... | 252/385 X |
| 2,050,249 | 8/1936 | Adler ......................... | 23/107 |
| 2,154,977 | 4/1939 | Furness et al. ............. | 252/385 X |
| 2,364,767 | 12/1944 | Zizinia et al. ............. | 252/385 X |
| 2,515,577 | 7/1950 | Waldeck ..................... | 252/385 X |
| 2,589,330 | 3/1952 | Bradford et al. ........... | 252/385 X |
| 2,668,147 | 2/1954 | Blaser et al. ............... | 23/107 X |
| 2,846,401 | 8/1958 | McCarthy et al. .......... | 252/385 X |
| 3,419,379 | 12/1968 | Goodale et al. ............ | 252/385 X |

*Primary Examiner*—Herbert T. Carter
*Attorneys*—Thomas B. Graham, Milton Zucker and Eugene G. Seems

ABSTRACT: A free-flowing crystalline noncaking trisodium phosphate dodecahydrate product is formed by crystallization from water solution in the presence of a small amount of sodium sulfate so that the product formed by evaporation will actually have cocrystallized therewith about 0.25 to 0.80 percent by weight of sodium sulfate on the dry crystal basis. The product prepared by this method of cocrystallizing the trisodium phosphate with a trace of sodium sulfate has the advantage of being a noncaking material under storage conditions of ordinary variable atmospheric temperature and humidity.

PROCESS FOR THE PRODUCTION OF TRISODIUM PHOSPHATE

BACKGROUND OF THE INVENTION

Trisodium phosphate and variations of the composition exist in hydrated forms and despite the fact that they exist in hydrated forms they have the additional characteristic of forming large hard cakes. That is, storage of any significant amount of trisodium phosphate crystals in contact with each other, in due time, as a result of the effect of variations of humidity induces surface wetting of the crystals, which in turn induces a bonding of the crystals to each other. The phenomenon manifests itself by the conversion of a mass of sodium phosphate crystals into a large hard intractable cake. While this has no effect on the chemical properties of the compound, it is a matter of some distress to the users, particularly those who use the compound in any significant amounts. The difficulty and inconvenience of breaking the cakes and measuring the chemical with any degree of precision when it is formed into large irregular lumps is manifest.

It is, accordingly, a fundamental object of this invention to provide a noncaking form of trisodium phosphate dodecahydrate characterized by its having been crystallized in the presence of a trace amount of sodium sulfate in the range of 0.25 to 0.8 percent, by weight, thereof.

Another object of the invention is to provide a novel form of trisodium phosphate dodecahydrate with the sodium sulfate in a crystalline form, the material being protected against caking.

DETAILED DESCRIPTION OF THE INVENTION

In carrying out the invention trisodium phosphate is made by alkalizing a solution of phosphoric acid or monosodium phosphate and, for purposes of our operation, it is alkalized with a ratio of sodium to phosphorus of about 3.25 to 1, on a molar basis. This is a slight excess of sodium, but it is a product of necessity in producing a compound which will have the empirical composition $Na_3PO_4 \cdot 12H_2O \cdot \frac{1}{4}NaOH$ That is, to be sure that the sodium phosphate is fully neutralized, it is formed by evaporation of a solution with a small amount of excess sodium hydroxide. To the aqueous liquor containing the sodium phosphate for evaporation, sodium sulfate is added to produce a sodium sulfate concentration of 0.20 to 0.8 percent by weight of the sodium phosphate on an anhydrous basis. This solution, or liquor, containing the sodium phosphate and sodium sulfate is then evaporated and processed, for example, in conventional style in a single step rotary drier under conditions adjusted to bring about crystallization of the dodecahydrate salt. The final product which crystallizes is thereafter screened and packaged.

We have found that a product prepared under these conditions can be stored and no caking will be evident to careful inspection over a range of 15 to about 25 percent alkalinity; temperature of storage 15° to 45° C.; and humidity 15 to 90 percent, relative. This alkalinity is a measure of the excess sodium hydroxide present and the conditions of noncaking are those generally associated with storage, handling and packaging.

When oversized crystals produced in the drying operation were milled to reduce them to a more acceptable granular-size material, caking was not observed.

Thus, in accordance with the invention, we have produced as a novel product a noncaking trisodium phosphate dodecahydrate, using sodium sulfate in the composition to prevent caking. This is no detriment to the industrial use of the compound, because in virtually none of the uses to which the sodium phosphate is put does sodium sulfate cause problems.

The new product is characterized by its being formed as very hard granules of sodium phosphate when 0.5 percent of sodium sulfate was present in the feed liquor going to the dryer.

A better understanding of the invention can be derived from the following detailed description of a pilot scale operation of the process.

Tests were carried out in a pilot plant operation involving a 16 inch by 11 foot rotary calciner as a dryer. With individual operations involving the drying of sodium phosphate solution, being 8 hours in length, observation of the variables of sodium sulfate concentration in the feed liquor, degree of drying, packaging temperature and effects of size reduction were made.

We have found that crystallization of the appropriately adjusted solution is carried out by making all adjustments of the composition of the solution in a makeup tank and feeding the solution at a rate determined by the composition to the evaporation apparatus. In a favorable working version this is a rotary dryer direct-fired, and countercurrent fed. The conditions of operation of the dryer are such that the liquid enters at a temperature of about 95° to 110° C. and the product is discharged at a temperature of about 40° to 54° C. The inlet gas temperature is at about 100° to 120° C. It is important that the product discharge temperature be kept below 55° C., because this also is the melt-temperature of the dodecahydrate crystals sought. That is, if the product discharge temperature tends to rise above 55° C. the product may well be sodium phosphate with enough water to form the dodecahydrate, but the material will be liquid rather than crystalline.

Detailed observation of the four variables involving adding varying amounts of sodium sulfate to the feed liquor in the range from 0.25 to 0.80 percent indicated that a concentration of sodium sulfate of 0.3 percent in the feed liquor is sufficient to produce a product trisodium phosphate dodecahydrate having the desired noncaking properties. At this level of sodium sulfate in the product, not only is there no evidence of caking during ordinary warehouse storage conditions, regardless of the extent of the drying of the product or the packaging temperature, but also the material has so little sodium sulfate in it that for all industrial purposes it can be ignored.

Accordingly, in the practice of the process the sodium phosphate solution, as concentrated as is feasible under the conditions of approach to the dryer, usually about 50 percent concentration, by weight, of sodium phosphate anhydrous, has 0.3 percent, by weight of sodium phosphate dodecahydrate crystals, of sodium sulfate fed to it as or before it enters the dryer. The dryer is operated under normal conditions rotating at a rate of 33.0 revolutions per minute and in such operation in the 11 foot rotary dryer, the free-flowing material zone increased from 3 feet to about 6 feet in length under the conditions of the process. The alkalinity of the product process increased also from 18 percent to approximately 19 percent. With recovery of the trisodium phosphate dodecahydrate at the end of the process it was found by analysis it answered to the formula $Na_3PO_4 \cdot 12H_2O \cdot \frac{1}{4}NaOH$.

Actually, the following were the operating conditions under which the product was prepared.

Pilot plant operating conditions

Dryer dimensions: 16 inches by 11 feet with a 1 inch dam at the discharge.
Feed rate: 0.20 gallons per minute.
Feed Baume' (at the boiling point): 41 to 42
Feed ratio, Na/P: 3.24 to 3.26 $Na_2SO_4$ concentration 0.30% (on a dry crystal basis),
Dryer inlet gas temperature: 180° F. (80° C.).
Material temperature (product): 100 to 110° F. (40 to 45° C.).
Length of dry zone: 5 to 6 feet.

Similar results are obtained when the amount of sodium sulfate is increased to 0.5 percent and to 0.7 percent. Further since no proportional advantage is gained in operation, or in the physical properties of the material, it is best for most purposes to keep the amount of sodium sulfate in the product as low as is consistent with obtaining results sought, namely, at a level of about 0.3 percent.

It has been theorized that the process involves crystallization of the pure trisodium phosphate dodecahydrate crystals with the sodium sulfate remaining in solution. When the concentration of sodium sulfate in the liquor phase in the dryer reaches some desired point, either the decahydrate or the anhydrous sodium sulfate, it crystallizes out of solution and deposits in the outer layers of the individual trisodium phosphate crystals. The system is $Na_3PO_4 \cdot 12H_2O \cdot \frac{1}{4}NaOH - Na_2SO_4 \cdot 10H_2O$. The extended dry zone induced by the addition of sodium sulfate indicates that the decahydrate is formed in the wet zone. As the material temperature increases past the sodium sulfate decahydrate melt point (32.4° C.) moisture is released uniformly until the anhydrous form (sodium sulfate) is achieved at dryer discharge. The intermediate zone of trisodium phosphate dodecahydrate-sodium sulfate decahydrate is free flowing, as seen in the increased length of the dry zone.

The anhydrous sodium sulfate resides on the crystal surfaces and acts as a dessicant to absorb moisture due to humid surroundings and crystal cleavages. The moisture, theoretically up to 0.38 percent moisture at 0.30 percent sodium sulfate, is picked up forming sodium sulfate decahydrate. Physically it appears as a white dusting on the crystals of phosphate.

In recapitulation it is to be observed that the trisodium phosphate liquor is prepared in conventional manner. A phosphoric acid solution of 40 percent to 60 percent concentration is neutralized. To produce the crystals which have the noncaking properties, the liquor should have a sodium-phosphorus molar ratio of about 3.25 to yield a product with the nominal composition $Na_3PO_4 \cdot 12H_2O \cdot \frac{1}{4}NaOH$. Sodium sulfate is added to the makeup phosphate liquor to give a concentration of 0.2 to 0.8 percent, by weight, of the final product. This sulfate containing liquor is then processed in the usual manner by feeding it to a single step rotary dryer, wherein in the length of the dryer the solution is converted to a solid crystal material, discharged from the far end, where the product is screened and packaged.

What is claimed is:

1. A process for the production of trisodium phosphate dodecahydrate $Na_3PO_4 \cdot 12H_2O \cdot \frac{1}{4}NaOH$ which comprises
   1. preparing a solution of trisodium phosphate having a molar ratio of sodium to phosphorus of about 3.25:1,
   2. adding to said solution an amount of sodium sulfate in the range of 0.2 to 0.8 percent, by weight of dry trisodium phosphate salt therein,
   3. evaporating said solution to cocrystallize said trisodium phosphate dodecahydrate with said sodium sulfate from said solution thereby to produce a trisodium phosphate dodecahydrate having the characteristic that it is stable in storage under ordinary variations of humidity and temperature without deterioration of the crystal and without the formation of agglomerated particles or cakes.

2. A process in accordance with claim 1, wherein the amount of sodium sulfate added is 0.30 percent of the trisodium phosphate dodecahydrate crystals.

3. A process in accordance with claim 1, wherein evaporation is carried out in continuous fashion, such that product is produced at a temperature between 40° and 55° C.

4. A process in accordance with claim 1, wherein the amount of sodium sulfate added is 0.5 percent, by weight, of the trisodium phosphate.